Feb. 18, 1947. J. W. PAYNE 2,416,214
METHOD FOR REGENERATION OF CONTACT MASS MATERIALS
Filed Jan. 4, 1946 2 Sheets-Sheet 1

INVENTOR
JOHN W. PAYNE
BY
John A. Crowley, Jr.
ATTORNEY or AGENT

Patented Feb. 18, 1947

2,416,214

UNITED STATES PATENT OFFICE 2,416,214

METHOD FOR REGENERATION OF CONTACT MASS MATERIALS

John W. Payne, Woodbury, N. J., assignor to Socony-Vacuum Oil Company, Incorporated, a corporation of New York Application January 4, 1946, Serial No. 639,141

19 Claims. (Cl. 196—52)

This invention relates to the regeneration of contact mass materials which have been used for processes tending to exhaust the utility of the contact material by deposition thereon of oily, tarry or other carbonaceous contaminants which may be removed therefrom by burning at elevated temperatures. This invention is particularly directed to a method for regeneration by burning of such spent contact materials while moving said materials through a regeneration zone as opposed to regeneration in situ.

Typical of the processes giving rise to such spent contact materials is the filtration or percolation of petroleum oils through particle form adsorbents for the purpose of removing color bodies and gum forming constituents. Such a process may be conducted at ordinary atmospheric temperatures giving rise to a spent adsorbent containing varying amounts of carbonaceous contaminants and existing at temperatures far below that required for the contaminant ignition. Another typical process is the catalytic conversion of hydrocarbons, it being well known that when hydrocarbons boiling in the range about 450° F. to 750° F. are contacted with suitable adsorbent type catalysts at pressure generally above atmospheric and at temperatures of the order of 800° F. and upwards, the hydrocarbons may be converted to gasoline and gas, resulting in the deposit of coky carbonaceous contaminants on the catalyst. Other typical processes are the catalytic treating, reforming, hydrogenation, dehydrogenation, polymerization, desulfurization or alkylation of relatively low boiling hydrocarbons. These processes have recently been developed as processes wherein the catalyst is moved through a conversion zone, separated from conversion products and regenerated in a separate regeneration zone.

Exemplary of the contact mass materials which may be regenerated by the method of this invention are natural or treated clays, bauxites and synthetic associations of silica, alumina or silica and alumina to which other constituents such as metallic oxides may be added for special purposes. Such contact materials are generally adsorbent in nature and may be pelleted, spherical or granular in shape and may fall within a large range of particle sizes depending upon the particular type of process for which they are employed. Thus, for example, when such adsorbents are employed for petroleum percolation purposes a particle size ranging between 30 to 60 mesh by Standard Tyler Screen Analysis is preferred. On the other hand for certain moving bed type continuous catalytic hydrocarbon conversion processes, particle sizes within the range of about 4 to 8 mesh are preferred.

Heretofore such spent contact materials have been regenerated by preheating the spent contact material to a practicable contaminant ignition temperature, if it exists below such temperature, and then by passing the preheated contact material through a regeneration zone wherein it is contacted with a combustion supporting gas acting to burn the carbonaceous contaminants. Considerable amounts of heat are liberated by the contaminant combustion, so that unless heat be withdrawn during the regeneration, the contact material would be heated to a temperature at which it would be permanently damaged. In order to prevent such heat damage to the contact material it has been convenient in the past to conduct the regeneration in complicated and expensive regenerators provided with accurately spaced heat transfer tubes and requiring external heat exchange medium circulation and cooling systems. Other prior art methods of regeneration, in general limited to suspension type processes, involve the passage of large quantities of cold flue gas through the regenerator along with the combustion supporting gas to carry off the excess regeneration heat. Such processes inherently involve high gas compressor costs, excessively large regeneration vessels, and considerable catalyst attrition and equipment abrasion due to the high gas velocities required. Another method which has been limited to regeneration of spent adsorbents already existing at a combustion supporting temperature involves the mixing of the spent adsorbent with a sufficient amount of cooled regenerated adsorbent to provide a regenerator charge mixture which exists at a temperature sufficiently high to support contaminant combustion but which is of such composition as to prevent its rise to a heat damaging level during the regeneration. Such a method has the disadvantage of requiring substantial increase in regenerator size to handle the very substantial increase in solid material throughput which throughput may be two or three times what it would be without adsorbent recycling.

A major object of this invention is the provision of an improved method for regeneration of spent contact mass materials bearing carbonaceous contaminants which method permits burning of the contaminant deposits from the contact material under controlled temperatures and in the absence of extraneous heat exchange fluid circulation through the regeneration zone.

Another object of this invention is the provision in a process for regenerating by burning of spent adsorbent materials existing at temperatures below the practicable ignition temperature of the contaminant deposited on said adsorbent, of a method for initiating the contaminant combustion without the requirement of preheating said spent adsorbent to the practicable contaminant ignition temperature before its introduction into the regeneration zone.

Another object is the provision in a continuous catalytic process for the conversion of hydrocarbons of an improved method for regeneration of the hot spent catalyst from the conversion zone which method permits catalyst regeneration under controlled temperatures without the requirement for indirect heat transfer between catalyst and an extraneous heat exchange fluid within the regeneration zone.

These and other objects of this invention will become apparent from the following description of the drawings attached hereto, of which drawings

Before proceeding with a description of the drawings, several terms used in describing and in claiming this invention will be defined. The word "gas" as used herein is intended in a sense sufficiently broad to include any material which exists in the gaseous phase under the operating conditions involved regardless of the normal phase of such material at ordinary atmospheric conditions. The terms "hot adsorbent" or "hot contact mass material" are intended to mean adsorbents or contact mass materials at a temperature substantially above the practicable ignition temperature of the contaminant deposited thereon. The term "practicable ignition temperature" is intended to mean the lowest temperature at which contaminant combustion will begin at a practicable rate. A practicable combustion rate for carbonaceous contaminants is of the order of 0.1 to 0.5 pound carbon burned per hour per cubic foot of adsorbent volume in the burning zone. The expression of the amount of contaminant deposit on the adsorbent or contact material or the amount of contaminant burned therefrom as a percentage carbon by weight of the adsorbent or contact material has been found to be a convenient and useful means of expression of contaminant content since carbon is generally the principal constituent of the contaminant. It should be understood, however, that while the expression accurately sets forth only the carbon content of the contaminant, the contaminant may at the same time consist partially of hydrogen in combination with said carbon and of minor quantities of other combustible impurities. The term "heat damaging temperature" is intended to mean that temperature at and above which the contact material or adsorbent will suffer substantial permanent decrease in its effectiveness for the process in which it is employed. This generally means a substantial permanent decrease in its adsorptive properties.

By the method of this invention spent contaminant bearing adsorbent existing at a temperature below the practicable ignition temperature of the contaminant deposited thereon and existing at such a temperature as will provide sufficient sensible heat adsorption capacity in the spent adsorbent charge to prevent its rising to a heat damaging temperature during the regeneration thereof is passed through a confined regeneration zone wherein it is contacted with a combustion supporting gas, such as air, which acts to burn off the contaminant from the adsorbent. In order that the combustion may be initiated, a relatively small amount of hot, preferably contaminant bearing adsorbent existing at a temperature substantially above the practicable ignition temperature of the contaminant thereon is also admitted to the regeneration zone in separate streams. By this procedure combustion may be initiated without the necessity of preheating the spent adsorbent to a practicable ignition temperature before its charge to the regeneration zone. Thus advantage may then be taken of the sensible heat adsorption capacity of the relatively low temperature spent adsorbent so as to eliminate the requirement for heat transfer tubes and extraneous cooling mediums in the regeneration zone. This has not been possible heretofore because of the necessity of introducing the spent adsorbent into the regeneration zone at a temperature equal to or above the practicable ignition temperature of the contaminant deposited thereon.

Figure 1:
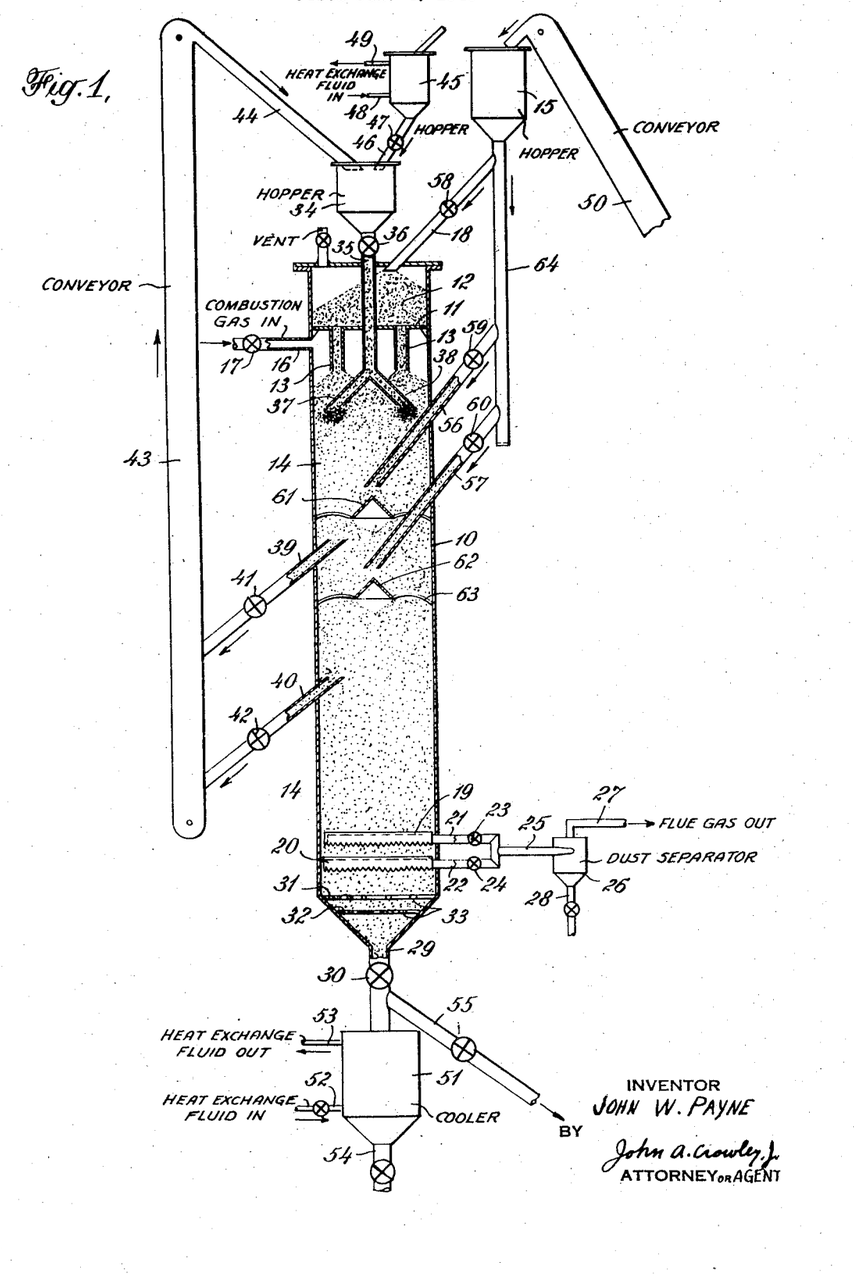
Figure 1 is an elevational view, partially in section, of an apparatus arrangement adapted for regeneration by the method of this invention of spent contact materials existing at low temperatures

Turning now to Figure 1, we find an elongated regeneration vessel 10 closed on both ends. This vessel may be of any practical cross-sectional shape. A partition 11 is positioned across the upper section of the vessel to provide a contact material surge zone 12. Conduits 13 depend from partition 11 to provide passageway for contact material flow from the surge zone into the regeneration zone therebelow. An inlet conduit 18 is provided for admittance of spent contact material into the top of the zone 12 from a supply hopper 15. A gas inlet conduit 16 with control valve 17 thereon is provided for admittance of combustion supporting gas to the upper section of the vessel 10. Two rows of horizontally extending gas collecting troughs 19 and 20 are provided near the lower end of the regenerator. These troughs may take any of a number of forms, for example, inverted channels or angles open on their bottoms. Gas outlet conduits 21 and 22 bearing valves 23 and 24 respectively are provided for withdrawal of gas from the collecting troughs and for delivery of said gas through conduit 25 to a dust separator 26. Substantially dust free spent regeneration gas passes from the separator 26 through conduit 27 while settled dust is withdrawn through conduit 28. It will be understood that the gas inlet and outlet means shown is merely diagrammatic in form and many structural variations thereof known to the art may be substituted therefor. In some cases it is preferable to provide a plurality of spaced gas inlet and outlet means at vertical intervals along the regenerator so as to divide it into a series of superimposed stages for substantially independent gas flow. Such a modification is desirable when heavy contaminant deposits are to be burned, since it permits the passage of greater amounts of gas through the contact material without disrupting its flow. In such modifications the gas flow may be concurrent or countercurrent to the flow of the contact material or it may be transverse thereto. The vessel 10 is provided at its bottom with a regenerated contact material outlet conduit 29 having a flow control valve 30 thereon. Within the vessel and just above the outlet conduit are provided horizontally extending partitions 31 and 32 having properly distributed orifices 33 thereon so as to provide for uniform downward flow of contact material across the entire regenerator cross-section in the burning zone. Above the vessel 10 is positioned a hot contact material supply hopper 34 from the bottom of which depends a conduit 35, bearing valve 36, said conduit extending downwardly into the upper end of the regeneration zone where it splits into two or more material distributing conduits of which two, 37 and 38, are shown. Hot contact material withdrawal conduits 39 and 40 bearing valves 41 and 42 respectively are provided for withdrawal of hot contact material from either of two spaced levels in the burning zone of vessel 10. These conduits discharge into a conveyor 43 which may be any of a number of types adapted for transfer of hot solid particles, for example, a continuous bucket elevator. The contact material is discharged from the upper end of conveyor 43 through conduit 44 leading to the hot contact material supply hopper 34. A contact material preheating hopper 45 is positioned above the supply hopper 34 and connects thereinto through conduit 46 bearing valve 47. A heat exchange fluid inlet 48 and outlet 49 are provided on hopper 45. These may connect with a heat transfer coil positioned within hopper or the heating may be accomplished by passing a hot inert gas through the mass in hopper 45.

In operation spent contact material bearing a carbonaceous contaminant and existing at a relatively low temperature, for example, 300° F. is conducted from the process in which it was employed or from storage to supply hopper 15 by means of conveyor 50 of which only the upper end is shown. The spent contact material is passed through conduit 18 into the upper end of surge zone 12 wherein it replenishes the body of contact material maintained therein. The spent contact material then passes through uniformly distributed conduits 13 onto the column of contact material maintained within the regeneration zone 14. The contaminant deposited on the spent contact material may have a practicable minimum ignition temperature of the order of about 700° F. so that ordinarily the contaminant on the relatively cold spent contact material charge would not burn upon introduction into the regeneration zone 14. In order to start contaminant combustion, a relatively small amount of hot contact material still bearing a substantial carbonaceous deposit is withdrawn from the regeneration zone at a point below its upper end through conduit 39 or conduit 40. This hot contact material which may be at a temperature of the order of 850 to 1050° F. depending upon the location of its withdrawal from the regeneration zone is conducted by conveyor 43 and thence through conduit 44 to the hot contact material supply hopper 34. The hot contact material is passed from hopper 34 at a rate controlled by valve 36 on conduit 35 into the upper section of the regeneration zone 14. Upon being contacted with combustion supporting gas passed from a compressor (not shown) through conduit 16 onto the regeneration zone, the contaminant on the hot contact material immediately begins to burn before the hot contact material has had the opportunity to be substantially cooled by the surrounding relatively cold spent contact material.

By the combustion reaction heat is released thereby heating surrounding cold contact material to a combustion supporting temperature, the burning progressively spreading until at a varying distance down from the upper end of the burning zone substantially all of the contact material present is undergoing regeneration. The contact material passes downwardly through the regeneration zone, gradually increasing in temperature as the burning progresses but never reaching a heat damaging temperature which may be of the order of 1200° F. because of the sensible heat absorption capacity of the initially relatively cold spent contact material charge. Hot regenerated contact material is withdrawn from the bottom of the vessel 10 through conduit 29 and then passed through cooler 51 wherein it is cooled to the desired temperature for subsequent use by means of cooling medium introduced at 52 and withdrawn at 53. The finished regenerated and cooled contact material is withdrawn from the bottom of cooler 51 through conduit 54. Optionally hot contact material may be returned directly to a conversion process for use without cooling by passage through conduit 55.

While it is preferable that the hot contact material introduced through hopper 34 and conduit 35 into the regeneration zone should bear a substantial carbonaceous deposit, in many operations substantially regenerated hot contact material may be used for the same purpose. Since the small amount of hot contact material is deliberately introduced into the regeneration zones in separate concentrated streams in such a manner as to avoid quick and thorough mixing with the cold spent contact material, the hot regenerated contact material upon reaching the regeneration zone first contacts a relatively few cold spent contact material particles, and heats them to a temperature sufficient to support combustion of the contaminant thereon. The continued burning of the relatively few initially contacted spent contact material particles soon liberates sufficient heat to spread the zone of combustion to other particles.

In many cases the burning conditions in the upper section of the regeneration zone 14 may be improved by introduction of the low temperature spent contact material into the burning zone at a plurality of vertically spaced levels rather than all onto the top of said zone. Thus controlled portions of spent contact material may be passed from supply hopper 15 into a supply manifold 64 and from there through conduits 18, 56 and 57 by control of valves 58, 59 and 60 thereon respectively into the regeneration zone at several levels. Inverted conical shaped baffles 61 and 62 supported within the regeneration zone by rods 63 may be provided to distribute the spent contact material introduced through conduits 56 and 57.

Instead of recycling hot contact material from the regeneration zone itself for the purpose of initiation of combustion in the upper section of the regeneration zone, contact material may be supplied to hopper 45 from an external source and then heated in hopper 45 to a temperature above the minimum practicable for contaminant ignition. The preheated contact material may then pass from hopper 45 through conduit 46 to the hot contact material supply hopper 34 and from there into the regeneration zone. The contact material may be heated in hopper 45 by direct or indirect heat exchange with a suitable heat exchange fluid introduced through conduit 48 and withdrawn through conduit 49.

The rate of introduction of hot contact material into the upper section of the burning zone should be only a minor fraction (that is less than 50%) of the volumetric rate of spent contact material thereinto. Preferably the rate of hot contact material introduction should be only 5%–15% of that of the relatively cool spent contact material. From this it will be apparent that the method of this invention does not rely on the transfer of sensible heat from hot to cold contact material charged to heat the entire mixed charge to a practicable contaminant ignition temperature. That would cause a great reduction in the sensible heat absorption capacity of the spent contact material charge and it would be overheated during the regeneration. On the contrary the method of this invention relies on the provision in the upper section of the regeneration zone of a number of relatively small active zones of contaminant burning, which zones gradually grow until they incorporate the entire mass of contact material within the regeneration zone therebelow.

The temperature of the hot contact material introduced to the upper section of the regeneration zone should be substantially above the practicable ignition temperature of the contaminant deposited thereon. The practicable contaminant ignition temperature varies depending principally on the hydrogen to carbon ratio of the contaminant being lower for higher hydrogen to carbon ratios. In general the temperature may vary from about 700° F. to 850° F. and it is preferable that the temperature of the hot contact material be of the order of about 800° F. to 1100° F. or higher for hot contaminant bearing contact material and of the order of about 950° F. to 1200° F. or higher for hot regenerated contact material.

The desirable spent contact inlet temperature is dependent upon the amount of contaminant deposited thereon, upon the maximum temperature to which the particular contact material may be heated without causing heat damage thereto and upon the sensible heat removing capacity of the regeneration gas throughput. The maximum allowable temperature to which the contact material may be heated without causing heat damage thereto varies for different materials, being of the order of about 1200° F. for natural and treated clays and of the order of about 1400° F. for synthetic silica alumina gel type catalysts. The amount of heat that may be removed by the regeneration gas depends upon the rate of gas introduction to the regeneration zone and upon the amount of its preheat. Generally in regeneration processes wherein the contact material is passed through the regeneration zone as a substantially compact column, the amount of regeneration heat removable by the gas alone is a minor fraction of the total regeneration heat release and often a negligible fraction. In the following table are shown typical combinations of air and spent contact material inlet temperatures involved which will permit regeneration of a clay type catalyst containing various amounts of carbonaceous deposits of the types resulting from hydrocarbon conversion operations without causing the catalyst temperature from exceeding about 1200° F. In these examples the amount of air used is about 25% in excess of that theoretically required to substantially regenerate the catalyst and the rate of hot catalyst recycle is about 10% by volume of that of the spent catalyst introduction.

| Contaminant deposit on spent catalyst per cent carbon by wt. of catalyst | Air inlet temp., ° F. | Spent catalyst inlet temp., ° F. |
| --- | --- | --- |
| 1.5% | 800 | 600 |
| 1.5% | 100 | 800 |
| 2.0% | 800 | 400 |
| 2.5% | 400 | 400 |
| 3.0% | 280 | 280 |

In operations involving the regeneration of adsorbents used for petroleum percolation the spent adsorbent inlet temperature to the regenerator may be as low as 100° F. in which case it may be sometimes preferable to employ preheated air or flue gas containing air for the combustion supporting gas so that substantially no regeneration heat is removed from the regeneration zone by the regeneration gas. In some such operations wherein the amount of contaminant deposit is relatively low the sensible heat absorption capacity of the spent adsorbent may be much more than required to limit the adsorbent temperature below a heat damaging level during the contaminant burning. In such instances it may be desirable to heat the spent adsorbent to some suitable temperature, for example 300° F. to 500° F., before charging it to the regeneration zone. In other operations such as catalytic hydrocarbon conversion processes, the spent adsorbent may be obtained from the convertor at temperatures of the order of 850° F. which may be so high as to cause overheating of the adsorbent during regeneration. In such instances it may be necessary to cool the adsorbent to a proper regenerator inlet temperature before charging it to the regenerator.

Figure 2:
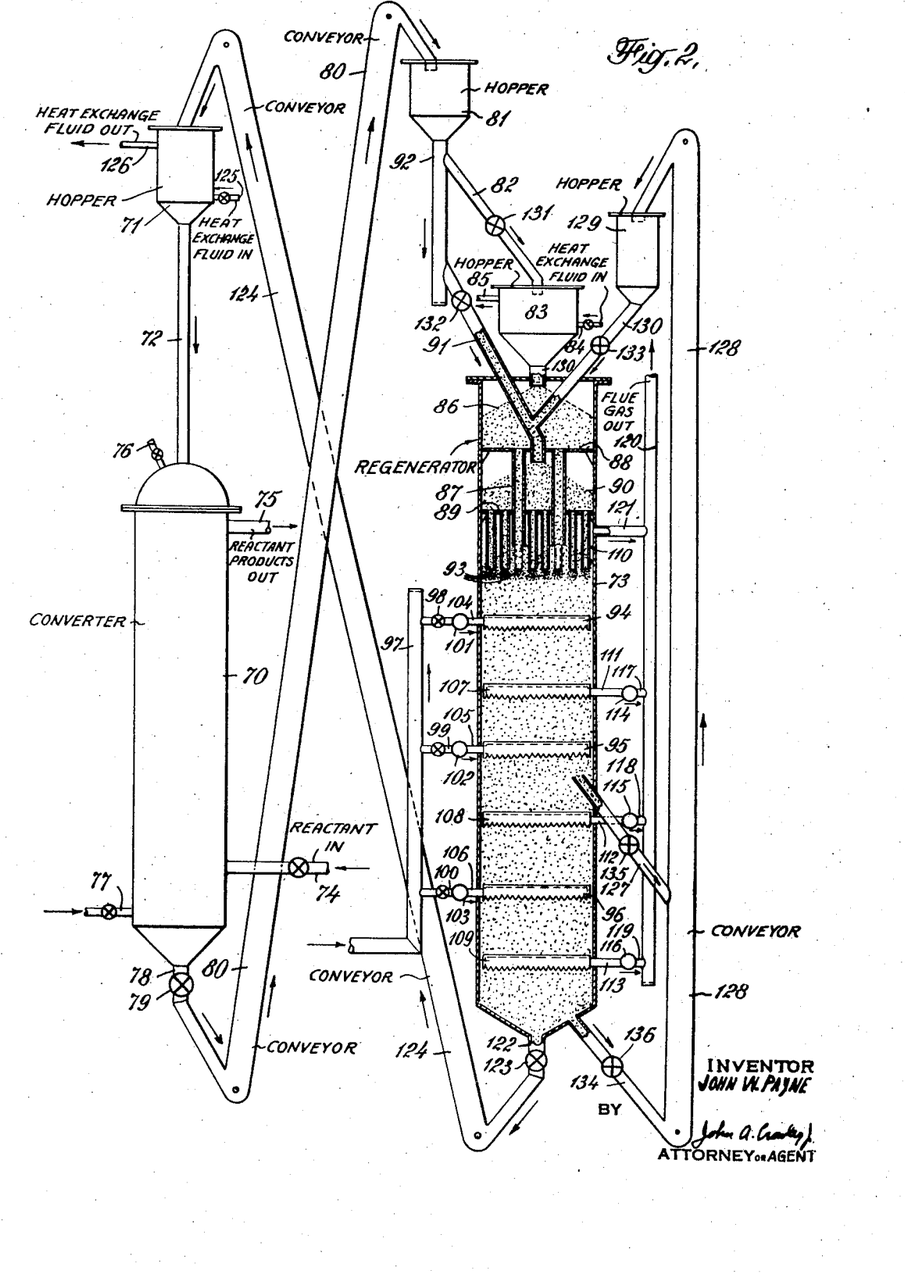
Figure 2 is a similar drawing showing the application of the method of this invention to a continuous catalytic hydrocarbon conversion process. Both of the drawings are highly diagrammatic in form.

An apparatus arrangement adapted to permit this latter type of operation is shown in Figure 2. In Figure 2, there is shown a conversion vessel 70, to which freshly regenerated catalyst is fed from supply hopper 71 through feed leg 72, and a regeneration vessel 73 to burn the contaminant from the spent convertor catalyst. Heated hydrocarbons may be admitted to the convertor 70 through conduit 74 and gaseous products withdrawn through conduit 75. If desired the functions of conduits 74 and 75 may be reversed so as to provide concurrent hydrocarbon and catalyst flow in the convertor. An inert seal gas is admitted to the convertor at its upper end through conduit 76 and at its lower end through conduit 77. Catalyst may be admitted to the upper end of the convertor through feed leg 72 at a suitable conversion temperature generally within the range 850° F.–1100° F. Spent catalyst bearing a carbonaceous contaminant may be withdrawn from the lower end of convertor 70 through conduit 78 and flow control valve 79 to conveyor 80 by which it is conducted to a hopper 81 located above the regenerator. The catalyst supplied to hopper 81 may range in temperature from about 750° F. to 950° F. depending upon the operation. The spent catalyst supplied to hopper 81 is divided into two streams. A major stream passes through conduit 82 to heat exchanger 83 wherein it is cooled to a temperature below the practicable ignition temperature of the contaminant deposited thereon, said temperature being such as to permit burning of the contaminant deposit from the catalyst without the catalyst rising to a heat damaging level during the process. Heat exchange fluid is introduced to exchanger 83 through conduit 84 and withdrawn therefrom through conduit 85. The heat exchange fluid may be a liquid passed through tubes within the exchanger or it may be a gas passed directly through the catalyst mass within the exchanger. The cooled spent catalyst passes from exchanger 83 through conduit 130 to surge chamber 86 from which it passes through uniformly distributed conduits 87 depending from partition 88 to the regeneration zone therebelow. A second partition 89 positioned across the regenerator at a level below partition 88 provides a second surge chamber 90. The minor stream of the spent catalyst from hopper 81, still existing at a temperature above the minimum practicable ignition temperature of the contaminant deposited thereon, passes through conduits 92 and 91 into the second surge chamber 90. The hot spent catalyst from chamber 90 is passed in a plurality of separate streams through conduits 93, depending from partition 89 into the regeneration zone at a level slightly below the level of introduction of cooler spent catalyst into said zone. The contaminant on the hot spent catalyst begins to burn and the burning spreads to the contaminant on the surrounding cooler spent catalyst particles. A plurality of vertically spaced rows of gas distributing troughs are provided within the regeneration zone, one trough in each row being visible at 94, 95, 96. Combustion supporting gas from manifold 97 is supplied to the conduits 98, 99 and 100 into horizontal manifolds 101, 102 and 103 respectively, from which horizontal manifolds it passes through rows of conduits such as 104, 105 and 106 to the rows of gas distributing troughs, such as 94, 95 and 96 respectively. The gas from the distributing troughs passes in part upwardly and in part downwardly through the column of catalyst within the regeneration zone and is separated from the catalyst by means of rows of vertically spaced collecting troughs arranged alternately with respect to the rows of distributing troughs so as to provide a plurality of superimposed burning zones. One collecting trough in each row is visible at 107, 108 and 109. The catalyst free space 110 provided below partition 89 serves in place of an upper row of collecting troughs. Spent regeneration gas passes from troughs 107, 108 and 109 through outlet conduits 111, 112 and 113 respectively and then via manifolds 114, 115 and 116 respectively to 117, 118 and 119 and then into main outlet duct 120. Gas from space 110 passes directly through conduit 121 to duct 120. Regenerated catalyst passes from the bottom of regenerator through conduit 122 and flow control valve 123 to conveyor 124 by which it is transferred to convertor supply hopper 71. The temperature of the regenerated catalyst may be adjusted to the desired convertor inlet temperature by means of heat exchange fluid introduced through conduit 125 to tubes within hopper 71 and withdrawn from said tubes through conduit 126. Alternatively, heat transfer tubes (not shown) may be provided below the lowest burning zone in the regenerator to permit cooling of the regenerated catalyst.

If desired the minor portion of hot spent catalyst introduced to chamber 90 through conduit 91 may be supplemented or entirely replaced by hot partially regenerated catalyst withdrawn from the regeneration zone through conduit 127 and conducted by conveyor 128 to hopper 129 from which it passes through conduit 130 to chamber 90. Suitable flow control valves or devices 131, 132 and 133, are provided on conduits 82, 91 and 130, respectively, to permit proper control of the relative rates of hot and cooled catalyst flow to the regenerator. Hot regenerated catalyst withdrawn to conveyor 128 through conduit 134 may be substituted for the hot partially regenerated catalyst in many operations. Valves 135 and 136 are provided on drain conduits 127 and 134 to permit control of catalyst withdrawal or to conveyor 128 to permit complete stoppage of catalyst flow thereto.

As an example of commercial application of the above method of regeneration, a spent catalyst from a certain hydrocarbon conversion reaction is obtainable at 850° F. and bears a contaminant amounting to about 2.0% carbon by weight of the catalyst. The contaminant as well as the carbon also contains a certain amount of hydrogen chemically combined with the carbon. It has been found that one hundred tons per hour of such spent catalyst may be regenerated in a vessel having a cross-sectional area of approximately 100 square feet and about 10 superimposed burning stages, each about 5 ft. in height. The regenerated catalyst contains only about 0.25 to 0.35% carbon by weight. In such an operation, of the 100 tons per hour of spent catalyst, 90 tons may be cooled to about 600° F. before introduction to the regenerator. The remaining 10 tons, existing at about 850° F., may be introduced directly into the regenerator to initiate the burning. The 10 tons of hot spent catalyst corresponds to the stream of catalyst introduced to chamber 90 through conduit 91 and passed from chamber 90 into the column of cooler spent catalyst through the plurality of pipes 93. On a 100 square foot regenerator the pipes 93 may be 4" pipes arranged on 12 inch triangular centers, so as to provide about 114 of such pipes covering about 10% of the total regenerator cross section. In this arrangement the maximum distance of any particle of cooled catalyst, from hot catalyst just entering the catalyst column is about 4.9 inches. In the above operation the total rate of combustion supporting air introduced into all of the stages is about 31 tons per hour, introduced at about 100° F. The maximum temperature reached by the catalyst during the regeneration is about 1150° F. without use of any cooling by indirect heat transfer within the regeneration zone.

It may be said in general that in the case of any operation according to the method of this invention the temperature of the spent contact material charged to the regenerator should be such that its sensible heat absorption capacity between its inlet temperature and its heat damaging temperature is at least equal to the difference between the total heat released by the contaminant combustion and the sensible heat absorption capacity of the regeneration gas throughput.

It will be understood that the particular type of regenerator described hereinabove, the particular operation conditions and the stated applications of the method of this invention are exemplary in nature and are not intended as limiting the scope of this invention except as it may be limited by the following claims.

I claim:

1. The method for regenerating spent contact mass materials bearing carbonaceous contaminants which comprises: introducing said spent contaminant bearing contact material into a confined regeneration zone at a temperature sufficiently low to absorb as sensible heat the heat released by contaminant combustion without rising to a heat damaging temperature; also, introducing into said zone near the location of introduction of said spent contact material a minor fraction of its volume of hot contact material at a temperature substantially above the practicable ignition temperature of said contaminant, to initiate the combustion reaction, passing said contact material through said regeneration zone while contacting it therein with combustion supporting gas and withdrawing regenerated contact mass material from said zone.

2. The method for regenerating spent contact mass materials bearing carbonaceous contaminants which comprises: introducing spent contact material into one end of a substantially confined, elongated regeneration zone at such a temperature as to provide a sensible heat capacity in said contact material between its inlet temperature and its heat damaging temperature, which heat capacity is at least equal to the heat released by said contaminant combustion minus the sensible heat absorption capacity of the combustion supporting gas throughput; also introducing into the same section of said zone, as a plurality of separate streams, hot contact material bearing carbonaceous contaminant and existing at a temperature substantially above the practicable ignition temperature of said contaminant to initiate the contaminant combustion, the hot contact material in said plurality of streams amounting to only a minor percentage of the amount of said spent contact material introduced into said regeneration zone; passing said contact material through said regeneration zone, passing a combustion supporting gas through said zone in contact with said contact material at a rate sufficient to burn off said contaminant from said contact material and withdrawing regenerated contact material from the opposite end of said zone.

3. The method for regenerating spent contact mass material bearing carbonaceous contaminants which method comprises: introducing said spent contact material into the upper section of an elongated substantially upright regeneration zone, also introducing at least one separate stream of hot contact material bearing carbonaceous contaminant into the upper section of said zone, passing the contact material through said zone as a substantially compact column of downwardly moving solid particles, passing a combustion supporting gas through said zone at a rate sufficient to burn off said contaminants from said contact material and withdrawing regenerated contact material from the lower section of said zone, wherein the inlet temperature of said spent contact material is sufficiently low to prevent the heating of said material above a heat damaging temperature in said zone and wherein the temperature of said hot contact material is substantially above the practicable ignition temperature of the contaminant thereon so as to provide for ignition of contaminant combustion within said zone.

4. A method for regenerating spent particle-form adsorbents bearing carbonaceous contaminants by burning which method comprises: introducing said spent adsorbent into one end of an elongated, confined regeneration zone at a temperature which is below the practicable ignition temperature of the contaminant thereon and which is sufficiently low to prevent rise of said adsorbent temperature to a heat damaging level in said regeneration zone, also introducing into said zone hot, partially regenerated adsorbent at a volumetric rate amounting to only a minor fraction of said spent adsorbent introduction but at a temperature substantially above the practicable ignition temperature of the contaminant thereon so as to initiate contaminant combustion within said zone near the inlet end thereof, passing the adsorbent through said zone, passing oxygen containing gas through said zone at a rate sufficient to burn said contaminant, withdrawing substantially regenerated adsorbent from the other end of said zone and withdrawing a controlled amount of hot partially regenerated adsorbent from an intermediate point along said zone for recycle to the inlet of said zone as aforesaid.

5. The method for regenerating spent particle form contact material bearing carbonaceous contaminants by burning said contaminants therefrom which method comprises: maintaining a substantially vertical, confined, compact column of downwardly moving particle form contact material, passing an oxygen containing gas through said column at a controlled rate, replenishing said column at its upper end with spent contact material at a temperature below that required for practicable contaminant ignition and such as to provide a sensible heat absorption capacity in said spent contact material between its inlet temperature and that temperature above which it would be heat damaged at least equal to the difference between the total heat released by contaminant burning and the sensible heat removing capacity of the oxygen containing gas passed through said column, withdrawing substantially regenerated contact material from the lower end of said column, withdrawing hot only partially regenerated contact material from an intermediate section of said column and recycling it to the upper section of said column at a rate amounting to only a minor fraction of the rate of spent contact material admittance thereto so as to initiate the contaminant combustion within the upper section of said column.

6. The method for regenerating spent particle form contact material bearing carbonaceous contaminants by burning said contaminants therefrom which method comprises: maintaining a substantially vertical, confined, column of downwardly moving particle form contact material, passing an oxygen containing gas through said column at a rate sufficient to support substantially complete contaminant combustion, replenishing said column at its upper end with spent contact material at a temperature below about 700° F. and sufficiently low to provide heat adsorbent capacity between said inlet temperature and about 1200° F. which heat adsorbent capacity is at least equal to the difference between the total heat released by contaminant burning and the sensible heat removing capacity of the oxygen containing gas passed through said column, withdrawing substantially regenerated contact material from the lower end of said column, withdrawing hot only partially regenerated contact material at a temperature substantially above about 700° F. from an intermediate section of said column and introducing it as a plurality of uniformly distributed streams into the upper section of said column below its upper end at a rate amounting to only a minor fraction of the rate of spent contact material admittance thereto so as to initiate the contaminant combustion within the upper section of said column.

7. The method for regenerating spent contact mass materials bearing carbonaceous contaminants by burning which method comprises: introducing the spent contact material to an elongated, confined regeneration zone in a plurality of streams at a plurality of points along its length, at a temperature sufficiently low to absorb as sensible heat without rising to heat damaging temperatures the heat released by contaminant combustion introducing into said zone near one end thereof a plurality of separate streams of hot contact material bearing a substantial contaminant deposit at a temperature substantially above the practicable ignition temperature of the contaminant thereon and at a rate amounting to only a minor fraction of the total spent contact material introduction to said zone so as to permit initiation of contaminant combustion near the inlet end of said zone, passing the contact material through said zone while contacting it with combustion supporting gas in sufficient quantity to substantially burn off the contaminants on said contact material and withdrawing substantially regenerated contact material from the opposite end of said zone.

8. The method for regenerating spent particle form contact material bearing carbonaceous contaminants by burning said contaminants therefrom which method comprises: maintaining a substantially vertical, confined, compact column of downwardly moving particle form contact material, passing an oxygen containing gas through said column at a rate sufficient to support substantial combustion of the contaminants on said contact material, introducing spent contact material into said column in a plurality of streams at a plurality of vertically spaced levels along the upper half of said column, said spent contact material being at a temperature substantially below about 700° F. and such as to provide a sensible heat absorption capacity in said spent contact material between its inlet temperature and that temperature above which it would be heat damaged at least equal to the difference between the total heat released by contaminant burning and the sensible heat removing capacity of the oxygen containing gas passed through said column, withdrawing substantially regenerated contact material from the lower end of said column, withdrawing hot only partially regenerated contact material at a temperature substantially above the practicable contaminant ignition temperature from an intermediate section of said column and recycling it to the upper section of said column at a rate amounting to only a minor fraction of the rate of spent contact material admittance thereto so as to initiate the contaminant combustion within the upper section of said column.

9. A method for regenerating spent particle form adsorbents bearing carbonaceous contaminants by burning which method comprises: introducing said spent adsorbent into one end of an elongated, confined regeneration zone at a temperature which is below that which is suitable for practicable ignition of the contaminant thereon and which is sufficiently low to prevent rise of said adsorbent temperature to a heat damaging level in said regeneration zone, also introducing near the end of spent adsorbent introduction a plurality of separate uniformly distributed streams of hot, partially regenerated adsorbent at a volumetric rate amounting to only a minor fraction of said spent adsorbent introduction but at a temperature substantially above the practicable ignition temperature of the contaminant thereon so as to initiate contaminant combustion within said zone near the inlet end thereof, passing the adsorbent through said zone as a substantially compact column of moving solid particles, passing air through said zone concurrently with said adsorbent at a rate sufficient to burn said contaminant, withdrawing substantially regenerated adsorbent from the other end of said zone and withdrawing a controlled amount of hot partially regenerated adsorbent from an intermediate point along said zone for recycle to the inlet of said zone as aforesaid.

10. In a process wherein a spent contact mass material bearing carbonaceous contaminants and existing below the practicable ignition temperature of said contaminants is regenerated by passage through a confined regeneration zone while contacting it therein with a combustion supporting gas acting to burn off said contaminants the method for initiating said contaminant combustion which comprises: passing into said zone near the solid inlet end thereof hot contaminant bearing contact material at a rate amounting to only a minor fraction of the rate of spent contact material introduction to said zone and at a temperature substantially above the practicable ignition temperature of the contaminants on said hot contact material.

11. The method for regenerating spent contact mass materials bearing carbonaceous contaminants which comprises: introducing spent contaminant bearing contact material into one end of a substantially confined elongated regeneration zone at such a temperature that its sensible heat capacity between its inlet temperature and its heat damaging temperature is at least equal to the heat released by combustion of said contaminant minus the sensible heat absorption capacity of the combustion supporting gas required for said combustion; also introducing into said zone near the same end thereof a plurality of separate streams of hot substantially regenerated contact material existing at a temperature substantially above the practicable ignition temperature of the contaminant deposited upon said spent contact material to initiate the combustion of said contaminant; passing a combustion supporting gas through said zone in contact with said contact material at a rate at least sufficient to burn off said contaminant from said contact material; and withdrawing regenerated contact material from the opposite end of said zone.

12. The method for regenerating spent contact mass material bearing carbonaceous contaminants which method comprises: introducing said spent contact material into the upper section of an elongated substantially upright regeneration zone, also introducing at least one separate stream of hot contact material into the upper section of said zone at a volumetric rate amounting to only a minor fraction of said spent contact material introduction, passing the contact material through said zone as a substantially compact column of downwardly moving solid particles, passing a combustion supporting gas through said zone at a rate sufficient to burn off said contaminants from said contact material and withdrawing regenerated contact material from the lower section of said zone, wherein the inlet temperature of said spent contact material is sufficiently low to prevent the heating of said material above a heat damaging temperature in said zone and wherein the temperature of said hot contact material is substantially above the practicable ignition temperature of the contaminant on said spent contact material so as to provide for initiation of contaminant combustion within said zone.

13. A method for regenerating spent particle form adsorbents bearing carbonaceous contaminants by burning which method comprises: introducing said spent adsorbent into one end of an elongated, confined regeneration zone at a temperature which is below the practicable ignition temperature of the contaminant thereon and which is sufficiently low to prevent rise of said adsorbent temperature to a heat damaging level in said regeneration zone, also introducing into said zone near the same end thereof a plurality of separate uniformly distributed streams of hot, at least partially regenerated adsorbent at a total volumetric rate amounting to only a minor fraction of said spent absorbent introduction but at a temperature substantially above the practicable ignition temperature of the contaminant thereon so as to initiate contaminant combustion within said zone near the inlet end thereof, passing the adsorbent through said zone, passing oxygen containing gas through said zone at a rate sufficient to burn said contaminant, withdrawing substantially regenerated adsorbent from the other end of said zone and withdrawing a controlled amount of hot at least partially regenerated adsorbent from an intermediate point along said zone for introduction into said zone as aforesaid.

14. The process for conversion of hydrocarbons which comprises: passing a particle form contact mass material at suitable conversion supporting temperature through a confined conversion zone while contacting it therein with heated hydrocarbons to effect the conversion thereof; withdrawing hot spent, contaminant bearing contact material from said conversion zone; cooling a major portion of said spent contact material to a temperature which is below the practicable ignition temperature of the contaminant thereon and which is sufficiently low to permit said contact material to absorb as sensible heat the heat released by combustion of the contaminant thereon, without rising to a heat damaging temperature; introducing said cooled, spent contact material into one end of an elongated, confined regeneration zone; introducing the remaining and minor portion of said hot spent contact material from said conversion zone into said regeneration zone near the same end thereof as a plurality of separate streams to initiate the contaminant combustion; passing said contact material through said regeneration zone; passing a combustion supporting gas through said zone in contact with said contact material at a rate sufficient to burn off said contaminant from said contact material; withdrawing regenerated contact material from the opposite end of said zone; and returning said regenerated contact material to said conversion zone.

15. A continuous catalytic process for hydrocarbon conversion which comprises the steps: passing a particle form adsorbent catalyst at suitable conversion supporting temperature through a confined conversion zone; introducing heated hydrocarbons into contact with said catalyst within said conversion zone to effect conversion thereof; withdrawing gaseous conversion products from said zone; withdrawing spent, contaminant bearing catalyst from said zone at a temperature above the practicable ignition temperature of said contaminant; cooling a major portion of said spent catalyst to a predetermined temperature below the practicable ignition temperature of said contaminant and such that the sensible heat absorption capacity of said cooled catalyst between said predetermined temperature and the heat damaging temperature of said catalyst is at least equal to the difference between the total heat released by burning said contaminant and the heat removed from the regeneration zone by the required combustion supporting gas; introducing said cooled, spent catalyst into the upper section of an elongated substantially upright regeneration zone; introducing the remaining portion of said hot spent catalyst directly into the upper section of said regeneration zone, below the level of said cooled catalyst introduction, as a plurality of separate streams uniformly distributed over the cross-sectional area of said regeneration zone; passing said catalyst through said regeneration zone as a substantially compact column of downwardly moving particles, passing a combustion supporting gas through said regeneration zone at a rate sufficient to burn off said contaminant from said contact material, withdrawing regenerated catalyst from the lower section of said regeneration zone and returning said regenerated catalyst to said conversion zone.

16. A continuous catalytic process for hydrocarbon conversion which comprises the steps: passing a particle form adsorbent catalyst at suitable conversion supporting temperature through a confined conversion zone; introducing heated hydrocarbons into contact with said catalyst within said conversion zone to effect conversion thereof; withdrawing gaseous conversion products from said zone; withdrawing spent, contaminant bearing catalyst from said zone at a temperature above the practicable ignition temperature of said contaminant; cooling a major portion of said spent catalyst to a predetermined temperature below the practicable ignition temperature of the contaminant deposited on said catalyst; introducing said cooled catalyst into the upper section of an elongated substantially vertical regeneration zone; introducing the remaining portion of said hot spent catalyst into the upper section of said regeneration zone as a plurality of separate uniformly spaced apart streams, passing said catalyst through said regeneration zone as a substantially compact column of downwardly moving particles, passing a plurality of streams of combustion supporting gas through a plurality of superimposed vertical sections of said column within said regeneration zone at a rate at least sufficient to support combustion of said contaminant on said catalyst, withdrawing regenerated catalyst from the lower section of said regeneration zone and returning it to said conversion zone wherein said predetermined temperature to which said major portion of spent catalyst from said conversion zone is cooled is such that the sensible heat capacity of said catalyst between said predetermined temperature and about 1200° F. is at least equal to the difference between the total heat released by contaminant combustion in said regeneration zone and the heat removed from said zone by the combustion supporting gas.

17. A continuous cyclic catalytic process for hydrocarbon conversion comprising the steps: passing a particle form solid contact material through a confined conversion zone as a substantially compact column of downwardly moving particles, introducing heated hydrocarbons into one end of said zone and withdrawing gaseous conversion products from the opposite end thereof, separately withdrawing spent, contaminant bearing contact material from said conversion zone at a temperature above the practicable combustion initiation temperature of the contaminant on said contact material, cooling said spent contact material to a temperature sufficiently low so that the sensible heat absorption capacity of said contact material below a heat damaging temperature is about equal to the heat of combustion of said contaminant, introducing said cooled spent contact material into the upper section of a substantially vertical, elongated regeneration zone, passing said contact material through said regeneration zone as a substantially compact column of downwardly moving particles, passing a combustion supporting gas through said regeneration zone in contact with said contact material at a rate at least sufficient to support combustion of said contaminant, withdrawing partially regenerated hot contact material from an intermediate level in said regeneration zone and introducing it as a plurality of separate streams into the upper section of said regeneration zone at a rate amounting to only a minor fraction of the rate of cooled spent contact material introduction thereinto: withdrawing regenerated contact material from the lower section of said regeneration zone and returning said regenerated contact material to said conversion zone.

18. A continuous cyclic catalytic process for hydrocarbon conversion comprising the steps: passing a particle form solid contact material through a confined conversion zone as a substantially compact column of downwardly moving particles, introducing heated hydrocarbons into one end of said zone and withdrawing gaseous conversion products from the opposite end thereof, separately withdrawing spent, contaminant bearing contact material from said conversion zone at a temperature above the practicable combustion initiation temperature of the contaminant on said contact material, cooling said spent contact material to a predetermined temperature, introducing said cooled spent contact material into the upper end of a substantially vertical, elongated regeneration zone, passing said contact material through said regeneration zone as a substantially compact column of downwardly moving particles, passing a combustion supporting gas through said regeneration zone in contact with said contact material at a rate at least sufficient to support combustion of said contaminant, withdrawing a stream of hot substantially regenerated contact material from said zone at a temperature substantially above the practicable ignition temperature of said contaminant on said spent contact material and at a volumetric rate amounting to only a minor fraction of the rate of spent contact material introduction to said regeneration zone, introducing said hot regenerated contact material as a plurality of separate streams into said regeneration zone shortly below its upper end to initiate the contaminant combustion, withdrawing the remainder of the regenerated contact material from the lower section of said regeneration zone and returning it to said conversion zone; wherein said predetermined temperature to which said spent contact material is cooled before introduction to said regeneration zone is sufficiently low that the sensible heat absorption capacity of said spent contact material below a heat damaging temperature is at least equal to the difference between the total heat released by the contaminant combustion and the heat removed from said regeneration zone by the combustion supporting gas.

19. In a process wherein a spent contact mass material bearing carbonaceous contaminants and existing below the practicable ignition temperature of said contaminants is regenerated by passage through a substantially vertical regeneration zone as a substantially compact column of downwardly moving solid particles while contacting it therein with a combustion supporting gas acting to burn off said contaminants the method for initiating said contaminant combustion which comprises: introducing hot contact material at a temperature substantially above the practicable ignition temperature of said contaminants into said column at a level shortly below its upper end as a plurality of separate compact streams distributed uniformly over the cross-sectional area of said column wherein the total rate of introduction of said hot contact material is only a minor fraction of the rate of spent contact material introduction into said regenerator zone.

JOHN W. PAYNE.

REFERENCES CITED

The following references are of record in the file of this patent:

UNITED STATES PATENTS

| Number | Name | Date |
| --- | --- | --- |
| 1,977,684 | Lucke | Oct. 23, 1934 |
| 2,162,893 | Kuhl | June 20, 1939 |
| 2,395,106 | Day et al. | Feb. 19, 1946 |